INVENTORS
KATSUMI SUGIMOTO
MIZUHO SUGAWARA

ATTORNEYS

United States Patent Office 3,502,608
Patented Mar. 24, 1970

3,502,608
VINYL CHLORIDE COPOLYMERIC PAINT SOLUTIONS IN AROMATIC HYDROCARBONS
Katsumi Sugimoto, Tokyo, and Mizuho Sugawara, Kamakura-shi, Japan, assignors to The Japanese Geon Co., Ltd., Tokyo, Japan
Filed Oct. 9, 1967, Ser. No. 673,768
Claims priority, application Japan, Oct. 7, 1966, 41/65,688
Int. Cl. C08l 45/28; C08k 1/22
U.S. Cl. 260—33.6                                    19 Claims

ABSTRACT OF THE DISCLOSURE

A paint composition having good heat, weather, water, chemical and flame resistance and a non-stimulant odor comprising a vinyl chloride copolymer comprising 50–80% by weight of vinyl chloride, 2–50% by weight of at least one ethylenically unsaturated monomers as represented by the structural formulas:

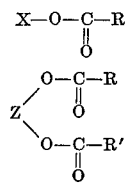

in which X is selected from the group consisting of

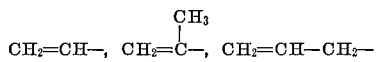

and

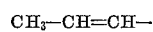

Z is

R is selected from the group conissting of hydrogen, acyclic or cyclic hydrocarbon groups having 1–12 carbon atoms, and 0–48% by weight of another monomer copolymerizable with vinyl chloride, and a solvent selected from the group consisting of aromatic hydrocarbons and a mixture containing an aromatic hydrocarbon.

BACKGROUND OF THE INVENTION

The present invention relates to a vinyl chloride type synthetic resin paint composition having desirable paint properties. More particularly, it is concerned with a vinyl chloride type synthetic resin paint composition comprising a vinyl chloride copolymer dissolved in a solvent comprising an aromatic hydrocarbon such as toluene or xylene or in a mixed solvent consisting mainly of an aromatic hydrocarbon, said vinyl chloride copolymer being provided by copolymerizing an ethylenically unsaturated monomer having a hydrocarbon group of 2 to 8 carbon atoms and an ester group in the molecule with vinyl chloride or, in addition, with an unsaturated monomer copolymerizable with vinyl chloride.

Up to the present time, the most widely used resin components in vinyl chloride type resin paint were vinyl chloride-vinyl acetate copolymers obtained by solution polymerization in a solvent such as ethyl acetate; suspension polymerization in water using various dispersing agents and emulsion polymerization using various emulsifying agents. As suitable solvents for these resins in forming paint compositions, however, a solvent having a high dissolving powder such as acetone, methyl ethyl ketone, methyl isobutyl ketone, ethyl acetate or tetrahydrofuran in amounts of at least 40% is required. These conventional vinyl chloride type resins are not soluble in toluene, xylene or other aromatic hydrocarbons at room temperature, but are rendered white-turbid or become swelled therein. The high dissolving power solvent suffers from the disadvantages that it cannot be spread or lap coated due to its low boiling point and high volatility. Another disadvantage is its stimulant odor and, where it is used to overcoat an oil paint film or aromatic synthetic resin such as polystyrene resin, acrylonitrile-styrene-butdiene (ABS) copolymer resin and acrylonitrile-styrene copolymer resin to impart water resistance, acid resistance, alkali resistance and flame retarding properties thereto, the undercoat material is deleteriously affected. A further disadvantage is that the high dissolving power solvent is more expensive than the aromatic solvents. The conventional vinyl chloride paints have been unsatisfactory, therefore, because of these disadvantages. Vinyl chloride-vinyl acetate copolymer, if the content of vinyl acetate is increased to more than 50%, becomes soluble in toluene at room temperature, but the other properties thereof such as heat resistance, weather resistance and water resistance deteriorate. Moreover, the chemical resistance and flame resistance characteristics of the vinyl chloride resins deteriorate to such an extent that they cannot be put to practical use.

We found that a copolymer of vinyl copolymer and vinyl propionate dissolved in aromatic hydrocarbon solvents such as toluene and xylene at room temperature yields a satisfactory paint. Additional investigation resulted in the discovery that other monomers copolymerizable with vinyl chloride yielded satisfactory paints.

BRIEF DESCRIPTION OF THE INVENTION

In accordance with the invention, there is provided a vinyl chloride type resin paint composition comprising (1) a vinyl chloride copolymer comprising (a) 50–80% by weight of vinyl chloride, (b) 2–50% by weight of at least one ethylenically unsaturated monomer as represented by the following general formulas:

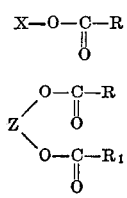

in which X is

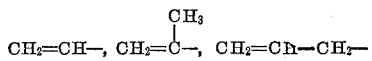

or

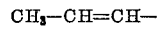

Z is

R is an acyclic or cyclic hydrocarbon group of 2–8 carbon atoms and $R_1$ is hydrogen or an acyclic or cyclic hydrocarbon group of 1–12 carbon atoms, and (c) 0–48% by weight of another monomer copolymerizable with vinyl chloride, and (2) a solvent comprisng an aromatic hydrocarbon or a mixed solvent consisting mainly of an aromatic hydrocarbon. The vinyl chloride type resin paint compositions of the present invention have much better features than those of the prior art vinyl chloride type paints. For example, paint workers are not subjected to the stimulant odor characteristic of the high dissolving power solvent of the ketone or ester type. Moreover, the workabilty and the ease of spreading or lap coating is improved. They can be utilized as a finishing of general oil paint without impairing the undercoat. Furthermore, they can yield a flame retarding film, coloring or ornamental film to moldings of synthetic resins normally subject to solvent attack, such as ABS resin, polystyrene resin, methacrylic resin, etc., without lowering their resin strength. These advantages are due to the fact that the vinyl chloride copolymer (1) of the paint composition of the invention is readily dissolved in solvents of aromatic hydrocarbons or mixed solvents of aromatic hydrocarbons with aliphatic or alicyclic hydrocarbons or alcohols, which are free of any high dissolving power solvent such as ketone or ester.

The importance of the invention lies in the fact that a paint composition can be prepared without using a ketone or ester solvent. The paint compositions of the present invention satisfy the third class of enamel (incombustible resin enamel) prescribed in the Japanese Industrial Standard (JIS) K–5582 relating to vinyl chloride resin enamels, in which the content of chlorine should be 30% or more by weight. By a chlorine content of 30% or more is meant that the content of vinyl chloride in the vinyl chloride copolymer is 56% or more. The vinyl chloride copolymer (1) having such content of vinyl chloride can be readily dissolved in a solvent of aromatic hydrocarbon free of high dissolving power solvent at room temperature to thereby give a paint capable of forming a flame, acid and alkali resistant film. Moreover, it can be dissolved in a mixed solvent of aromatic hydrocarbon to which alcohol or aliphatic or alicyclic hydrocarbon, which are poor solvents for vinyl chloride copolymers, can be added in small amounts.

DETAILED DESCRIPTION OF THE INVENTION

Figure 1:
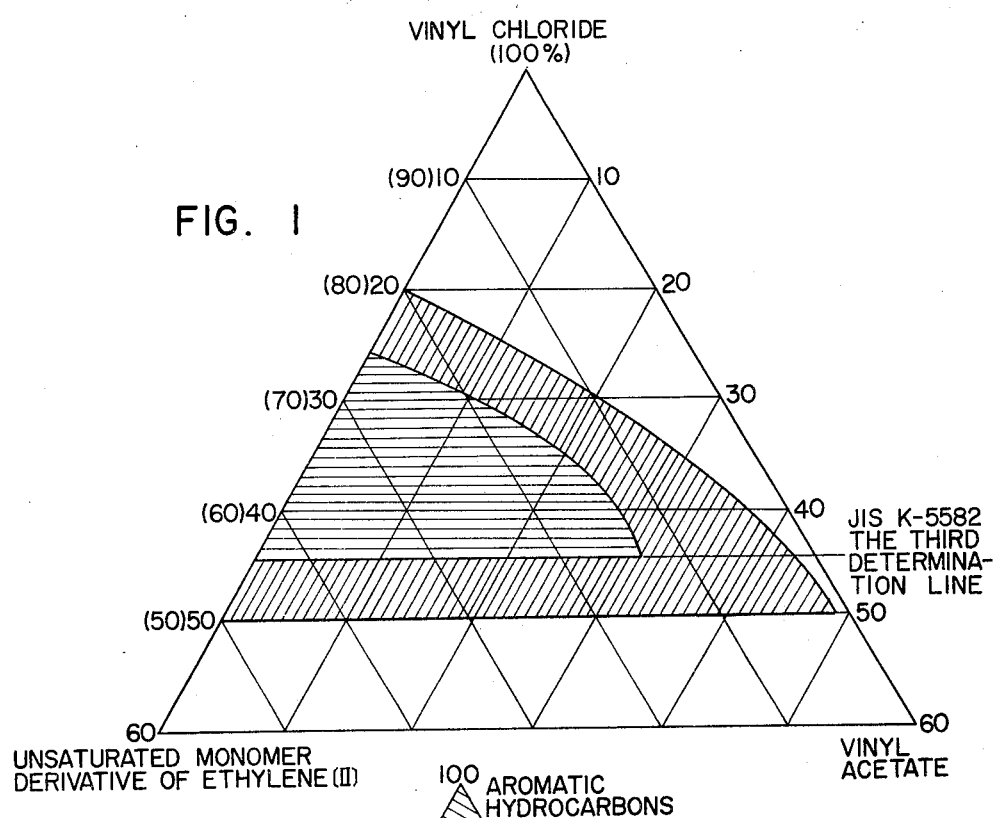
FIGURE 1 is a ternary diagram representing the ratios of components in a vinyl chloride copolymer (1) comprising vinyl chloride (a), vinyl propionate (b) and vinyl acetate (c)

The vinyl chloride copolymer composing the paint composition of the invention is a copolymer comprising (a) 50–80% by weight of vinyl chloride, (b) 2–50% by weight of at least one ethylenically unsaturated monomer including an ester (COO) group and acyclic or cyclic hydrocarbon group of 2–8 carbon atoms in the molecule and (c) 0–48% by weight of another monomer copolymerizable with vinyl chloride. The ethylenically unsaturated monomer (b) incorporated in the copolymer as an essential component is an unsaturated monomer having the following formulas:

$$X-O-\underset{\underset{O}{\|}}{C}-R$$

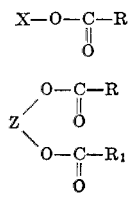

in which X is

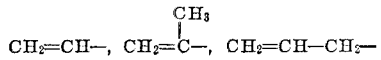

or $$CH_3-CH=CH-$$

Z is

R is an acyclic or cyclic hydrocarbon group of 2–8 carbon atoms and $R_1$ is hydrogen or an acyclic or cyclic hydrocarbon group of 1–12 carbon atoms. R, in the foregoing general formulas, may for example, be ethyl, n-propyl, isopropyl, n-butyl, isobutyl, t-butyl, n-amyl, isoamyl, n-hexyl, isohexyl, cyclohexyl, phenyl, benzyl, dimethylphenyl, ethylphenyl, n-octyl and 2-ethylhexyl groups. Illustrative of the monomer (b) are monobasic acid vinyls such as vinyl propionate, vinyl butyrate, vinyl valerate, vinyl caproate and vinyl benzoate; monobasic acid (iso)propenyls such as isopropenyl propionate and propenyl caprate; monobasic allyls such as allyl propionate; vinylidene diesters such as vinylidene dipropionate; and the like. Those substances are not included where R contains one carbon atom, i.e., methyl group and, nine or more carbon atoms, i.e. lauryl and stearyl. Therefore, not included are vinyl acetate, allyl acetate, vinyl laurate, vinyl myristate, vinyl stearate.

Where vinyl acetate is copolymerized with vinyl chloride to give vinyl chloride copolymers, 50% or more of that is required for obtaining a copolymer soluble in a solvent of aromatic hydrocarbon or a mixed solvent consisting mainly of an aromatic hydrocarbon, which results in a deterioration of the flame resistance, water resistance, acid and alkali resistance, weather resistance and heat resistance of the ultimate coating. Monomers such as vinyl laurate lower the softening point of the coating, often resulting in the phenomenon of fusing or stripping of the coating. Moreover, the solubility in aromatic solvents and the tearing strength of the coating are unsatisfactory.

The vinyl chloride copolymer of the invention may be a multi-component copolymer wherein a monomer copolymerizable with vinyl chloride (c) is copolymerized in addition to vinyl chloride (a) and the ethylenically unsaturated monomer (b). That is to say, the monomer (c) is not always necessary, but may be copolymerized in addition to (a) and (b). Illustrative of the monomer (c) copolymerizable with vinyl chloride are methyl esters of unsaturated organic acids such as vinyl acetate, methyl acrylate, methyl methacrylate and dimethyl maleate; higher esters of higher alcohols of 9 or more carbon atoms such as lauryl alcohol, myristyl alcohol and stearyl alcohol with unsaturated organic acids such as acrylic acid, crotonic acid, methacrylic acid, fumaric acid, itaconic acid and aconitic acid; unsaturated dibasic acid esters such as diethyl maleate, monooctyl maleate, diethyl fumarate, dihexyl fumarate, dibutyl itaconate and dioctyl itaconate; vinyl, allyl and isopropenyl esters of fatty acids of nine or more carbon atoms such as coconut acid and beef tallow acid; aliphatic monolefins such as ethylene, propylene, 1-butene, 2-butene, isobutene and pentene; alicyclic monoolefins such as cyclopentene, cyclohexene and cyclooctene; aromatic monolefins such as styrene, chlorostyrene, alpha- or beta-methyl-styrene and vinyl toluene; nitrogen-containing unsaturated compounds such as acrylonitrile, methacrylonitrile, vinylidene dicyanide, acrylamide and ethacrylamide; halogen-containing unsaturated compounds such as vinylidene chloride, dichloroethylene and trichloroethylene; unsaturated organic acids such as acrylic acid, methacrylic acid, maleic acid, fumaric acid, itaconic acid, aconitic acid, crotonic acid and cyclopentadiene-maleic acid adduct; vinyl ethers such as methyl vinyl ether, ethyl vinyl ether, octyl vinyl ether, lauryl vinyl ether, stearyl vinyl ether, phenyl vinyl ether, alkyl-substituted phenyl vinyl ether and ethoxyphenyl vinyl ether; halogen-containing vinyl ethers such as chloroethyl vinyl ether, chloropropyl vinyl ether and chlorophenyl vinyl ether; hydroxyl group-containing unsaturated monomers such as allyl alcohol, hydroxyalkyl acrylate, hydroxy-alkyl methacrylate and N-methylol acrylamide.

The vinyl chloride copolymer having the foregoing composition units can be prepared by polymerization of a monomer mixture of (a) about 45–90% by weight of vinyl chloride, (b) about 2–55% by weight of the foregoing ethylenically unsaturated monomer and (c) about 0–55% by weight of the monomer copolymerizable with vinyl chloride.

When producing the vinyl chloride copolymer of the invention from vinyl chloride (a) and the ethylenically unsaturated monomer (b), the resulting copolymer becomes soluble in aromatic hydrocarbons when the monomer (b) is incorporated in a proportion of 20% by weight, and more soluble therein with the increase of the proportion of the monomer (b). Thus, it is readily dissolved in not only a solvent of aromatic hydrocarbon, but also a mixed solvent of aromatic hydrocarbon and alcohol, aliphatic or alicyclic hydrocarbon, whereby the proportion of the poor solvent can be increased.

In the case of the multi-component copolymer of vinyl chloride (a), the ethylenically unsaturated monomer (b) and the other monomer (c) copolymerizable with vinyl chloride, this effect appears even upon adding the monomer (b) in a small amount of 2% by weight and the copolymer becomes readily soluble in an aromatic hydrocarbon mixed with a poor solvent as well as in aromatic hydrocarbons as the content of (b) is increased. The vinyl chloride copolymer of the invention when using vinyl acetate as the monomer (c) has a composition unit within a range represented by slant lines in the ternary diagram of FIGURE 1, preferably within a range represented by horizontal lines. The one in the range of the slant lines is ordinarily dissolved in toluene only, while the other in the range of horizontal lines is also dissolved in toluene, xylene, aromatic hydrocarbons of nine carbon atoms, e.g. Swasol #1000 and aromatic hydrocarbons mixed with alcohol, aliphatic or alicyclic hydrocarbon in small amounts.

Furthermore, the present invention is also concerned with another vinyl chloride type synthetic resin paint composition comprising (1') a vinyl chloride copolymer consisting of (a) 50–80% by weight of vinyl chloride, (b) 2–50% by weight of the ethylenically unsaturated monomer, (c) 0–47.95% by weight of another monomer copolymerizable with vinyl chloride and (d) 0.05–30% by weight of at least one unsaturated acid anhydride selected from the class consisting of maleic anhydride, itaconic anhydride and bicyclo (2,2,1)-5-heptene-2,3-dicarboxylic acid anhydride (cyclopentadiene-maleic anhydride addition product) and (2) a solvent of aromatic hydrocarbon or a mixed solvent consisting mainly of an aromatic hydrocarbon. Component (d) provides more excellent adhesiveness to metal, fiber and wood, coating strength and solubility in aromatic hydrocarbons.

In order to raise the adhesiveness to metals as well as coating strength, in general, it has been previously suggested to incorporate in the molecular structure of a polymer a functional group such as

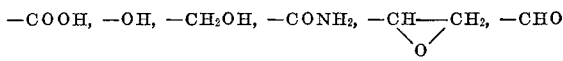

or

and ordinarily, to copolymerize a functional group-containing monomer such as (meth)acrylic acid, crotonic acid, maleic acid, (meth)acrylamide, N-methylol (meth) acrylamide, glycidyl (meth)acrylate, (meth)acrolein or hydroxyethyl (meth)acrylate. However, these monomers generally are difficultly copolymerized with vinyl chloride, lower markedly the reaction velocity and form a copolymer having a non-uniform composition. Such copolymer resins are not uniformly and clearly dissolved in aromatic hydrocarbons.

We have found that to raise the adhesiveness and coating strength without lowering the solubility in aromatic hydrocarbons, that maleic anhydride, itaconic anhydride and cyclopentadiene-maleic anhydride adduct, each being readily copolymerized, can accomplish favorably the foregoing objects and raise the solubility in aromatic hydrocarbons. The aforementioned unsaturated acid anhydride (d) may be copolymerized in the molecular structure of the copolymer in a proportion of 0.05–30.0% by weight, preferably 0.1–10.0% by weight. In a proportion of more than 30.0% by weight, the water resistance and alkali resistance of the coating film are lowered, while, in a proportion of less than 0.05% by weight, there is little effect. Preferably, the acid anhydride is dissolved in vinyl chloride monomer contained in a solvent such as acetic acid ester, fed to a polymerization reactor and copolymerized. The polymerization proceeds readily in a high yield.

The vinyl chloride copolymer used in the invention may be a copolymer prepared by the method of suspension, emulsion, mass or solution polymerization, and used for paints where only the copolymer itself is soluble in a solvent even though there occurs some lowering in the transparency of the solution due to the presence of the emulsifying agent, dispersing agent, polymerization catalyst, etc. remaining where the copolymer is dissolved in an aromatic hydrocarbon. Using a monomer differing markedly in its copolymerization velocity from vinyl chloride, for example, ethyl acrylate or butyl acrylate, it is necessary to effect copolymerization while adding incrementally or continuously a monomer having a high diminishing velocity.

The degree of polymerization of the vinyl chloride copolymer of the invention may be substantially the same as that employed generally in the known copolymers for paint, ordinarily within a range of from 100 to 800. The degree of polymerization is related to the solubility in solvents and the lower the degree of polymerization, the better the solubility limit viewing from the solution viscosity. Preparation of a vinyl chloride copolymer of a low degree of polymerization is carried out in the conventional manner, that is, by adding a polymerization chain transfer agent such as carbon tetrachloride or trichloroethylene during polymerization or by raising the polymerization temperature.

The solvent used for the paint composition of the invention comprises an aromatic hydrocarbon or a mixed solvent consisting mainly of an aromatic hydrocarbon. Illustrative of the aromatic hydrocarbon solvent are one or more of benzene, toluene, xylene, ethylbenzene, trimethylbenzene, methylethylbenzene, n-propylbenzene, isopropylbenzene, tetramethylbenzene, dimethylethylbenzene, diethylbenzene, methylpropylbenzene, butylbenzene, diisopropylbenzene, tetrahydronaphthalene and the like. The mixed solvent consisting mainly of an aromatic hydrocarbon consists mainly of the aforementioned aromatic hydrocarbon with a small amount of a solvent selected from (1) alcohols, (2) aliphatic or alicyclic hydrocarbons and (3) ketones, esters, halogenated hydrocarbons and ethers. The alcohols involve methanol, ethanol, isopropyl alcohol, n-butyl alcohol, isobutyl alcohol, t-butyl alcohol, 2-ethyl-hexyl alcohol, lauryl alcohol, cyclohexanol, benzyl alcohol, ethylene glycol, butane diol glycerine and the like. As the aliphatic or alicyclic hydrocarbons (2) are used aliphatic hydrocarbons such as n-pentane, isopentane, n-hexane, n-octane and isooctane; alicyclic hydrocarbons such as cyclopentane, cyclopentene, methylcyclopentane, cyclohexane, cyclohexene, methylcyclohexene, isopropylcyclohexane, and cyclopentadiene, and their mixtures. Mineral spirit, ligroin, petroleum ether, benzine, etc. are preferably used. As the ketones, esters, halogenated hydrocarbons and ethers (3) are used ketones such as acetone, methyl ethyl ketone, methyl isobutyl ketone, methyl isoamyl ketone and cyclohexanone, organic acid esters such as ethyl formate, methyl propionate and diethyl malonate, halogentaed hydrocarbons such as methyl chloride, dichloroethane, trichloroethylene, perchloroethylene, dichloropropane, ethylene chlorohydrin and propylene chlorohydrin, and ethers such as tetrahydrofuran and dioxane.

Figure 2:
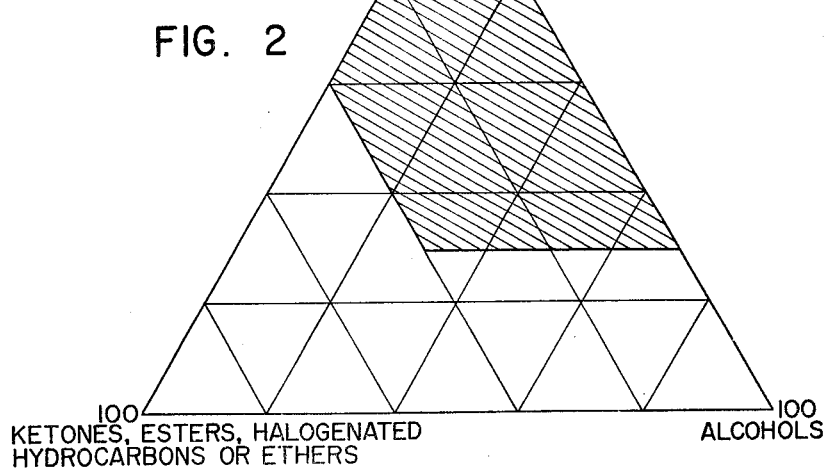
FIGURE 2 is a ternary diagram where the solvent comprises aromatic hydrocarbons, alcohols (1), and one or more solvents selected from ketones, esters, halogenated hydrocarbons and ethers.

In the cases of using a mixed solvent of aromatic hydrocarbon and alcohol (1), the proportion of the aromatic hydrocarbon must be within a range of from 30 to 100% by weight, preferably 50 to 100% by weight, since the alcohol is a poor solvent for the vinyl chloride copolymer of the invention. In the case of using a mixed solvent of aromatic hydrocarbon and aliphatic or alicyclic hydrocarbon (2), the proportion of the aromatic hydrocarbon must be within a range of from 50 100% by weight, preferably 70 to 100% by weight, since the aliphatic or alicyclic hydrocarbon is a poor solvent for the copolymer of the invention. In the case of using a mixed solvent of aromatic hydrocarbon and a solvent selected from ketones, esters, hologenated hydrocarbons and ethers (3), the proportion of the aromatic hydrocarbon must be within a range of from 60 to 100% by weight based on the solvent, since the solvent (3) is generally expensive and a good solvent for the vinyl chloride copolymer thereby lessening the advantages gained by its omissions. Although the solvent (3) is not always necessary, the addition thereof in a proportion of less than 40% by weight and, preferably less than 20% by weight gives good results. It will be understood from the above description that a mixed solvent of aromatic hydrocarbon with the foregoing (1) and (2) or with the foregoing (1), (2) and (3) may be used. For example, in using a mixed solvent of aromatic solvent with alcohol (1) and a solvent selected from ketones, esters, halogenated hydrocarbons and ethers (3) for the paint of the invention, preferred ratios of these components are within a range represented by slant lines in FIGURE 2.

The ratio of the vinyl chloride copolymer (1) or (1') and solvent (2) composing the paint composition of the invention may be varied according to the intended application, but, ordinarily, the ratio of the copolymer is within a range of from 5 to 60% by weight and preferably, 10 to 45% by weight although the invention is not intended to be limited thereby.

The paint composition of the invention may be mixed with various additives such as heat stabilizers, weathers discoloration inhibitor, plasticizer, lubricant, pigment, dye, mask strength imparting agent, filler, viscosity increasing agent, hardener and blocking inhibitor. As the heat stabilizer are used organic tin compounds such as dibutyl tin maleate, dibutyl tin dilaurate and dibutyl tin mercaptide; various cadmium and barium compounds; lead compounds such as lead sulfate and lead phosphite. As the weather discoloration inhibitor are used various epoxy group or glycidyl group-containing compounds such as epoxidized soybean oil, bisphenol epichlorohydrin condensate and cyclohexene oxide, and various ultraviolet ray absorbers. Among the other additives described above are included various low molecular weight plasticizers such as DOP, DBP, DOA, TCP, DOS and difatty acid esters of triethylene glycol; various high molecular weight plasticizers; lubricants of organic acid, their esters and salts such as stearic acid, lead stearate, barium stearate, butyl laurate and butyl stearate; the conventional lubricants such as higher alcohols, i.e. octyl alcohol and stearyl alcohol, bisamide and liquid paraffin; various nonionic surface active agents such as polyoxyethylene monolaurate; various ionic surface active agents such as sodium alkyl sulfate and sodium dodecylbenzenesulfonate; various dispersing agents such as ethylene oxide-propylene oxide addition polymer, partially saponified polyvinyl acetate, vinyl acetate-maleic anhydride copolymer, styrene-maleic anhydride copolymer and polymethyl vinyl ether; various pigment dispersing agents such as aluminum stearate, lecithin and polyethylene glycol alkyl ether; viscosity increasing agents such as bentonite; various blocking inhibitors such as paraffin and silicon compounds; and various pigments such as titanium white, zinc white, basic lead carbonate, cadmium red, iron yellow, chromium oxide, Phthalocyanine Green, carbon black, graphite, synthetic silica, red lead and zinc powder. As a resin to be used jointly with the composition of the invention are various synthetic resins such as acrylic resin, alkyd resin, vinyl butyral resin, epoxy resin, phenol resin, vinyl acetate resin, cumarone resin, chlorinated polyethylene, ethylene-vinyl acetate copolymer, and urethane resin; natural resins such as rosin and shellac; cellulose derivatives such as nitrocellulose and acetylcellulose; and oil paints such as linseed oil, soybean oil, epoxidized oil and unsaturated polyesters.

The vinyl chloride type resin paint of the invention can provide a film that has a high resistance to water, acid alkali, weather, heat discoloration and flame. In the known vinyl chloride type paints, for example, a copolymer of vinyl acetate dissolved in a single solvent of aromatic hydrocarbon, satisfactory properties as a paint cannot be obtained unless the content of vinyl chloride is adjusted to less than 50%, and a film formed from such paint is not resistant to water, weather, heat discoloration and flame. Accordingly, such paints have not been put to practical use. In order to overcome such disadvantages, a high dissolving power solvent such as ketones, esters, tetrahydrofuran and ethylene chloride is added in a proportion of at least 40% to an aromatic hydrocarbon.

Figure 3:
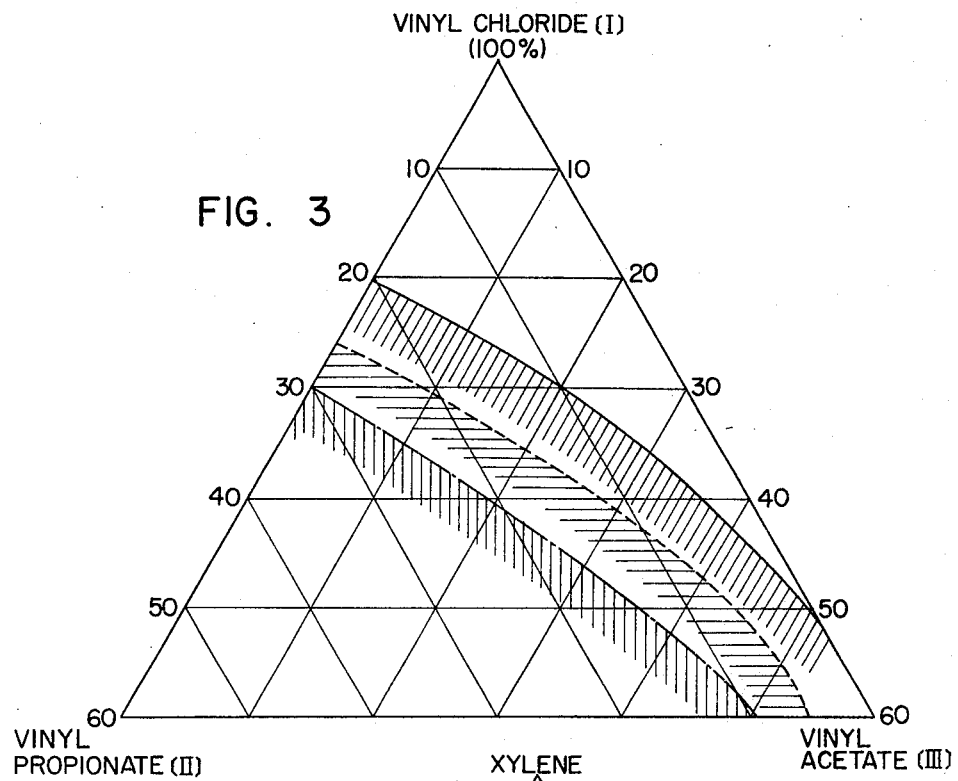
FIGURE 3 is a ternary diagram where the vinyl chloride copolymer of the invention comprises vinyl chloride (a), vinyl propionate (b) and vinyl acetate (c). The figure shows the relation between their ratios and solubilities in various aromatic hydrocarbon solvents.

With respect to a vinyl chloride copolymer comprising (a) vinyl chloride, (b) vinyl propionate as the ethylenically unsaturated monomer which is characteristic of the invention and (c) vinyl acetate, its solubilities in various aromatic hydrocarbons are shown in the ternary diagram of FIGURE 3. The range of the slant lines is a toluene-soluble zone; the range of the horizontal lines is a xylene- or Swasol-#1000 (aromatic hydrocarbon mixture of nine carbon atoms manufactured by Maruzen Oil Co., Ltd.)—soluble zone and the range of the vertical lines is a Swasol #1000/isopropyl alcohol (7/3) mixture-soluble zone.

The paint composition of the invention has a number of advantages as compared with the commonly used, various vinyl chloride type resin paints, solutions for impregnation, inks and pastes, each consisting mainly of a vinyl chloride-vinyl acetate copolymer. These are as follows:

(1) In the known vinyl chloride type paints, a stable paint free from phenomena such as deposition of resin components and gelation cannot be obtained without using a high dissolving power solvent such as ketones and esters, or, if provided by solution polymerization, esters are required to ease the polymerization. An improved paint using a solvent consisting of only aromatic hydrocarbon is provided by the invention, whereby paint workers are not subjected to the stimulant odors of ketones and esters.

(2) Bad workabilities of the known paints such as in spread coating and lap coating can be diminished by the invention. This is a problem in the prior art because of the use of volatile solvents such as ketones and esters. For improving the spreading property, it is desirable to use a high boiling solvent (150° C.) to suppress evaporation of the solvent, but, in the known vinyl chloride type copolymer, high boiling ketones or esters must be used, resulting in the generation of stimulant odors over extended periods. In accordance with the invention, it is possible to use an aromatic hydrocarbon of more than nine carbon atoms and eliminating the source of this stimulant odor, whereby the problem of spread coating and lap coating can also be solved. The phenomenon that an undercoat or film is swelled and deformed by brushing due to the use of a high dissolving solvent such as ketones and esters, can also be solved by the use of a poor solvent such as aromatic hydrocarbon only or a mixture of aromatic hydrocarbon and alcohol according to the invention.

(3) Use of a poor solvent to suppress the dissolving power, such as aromatic hydrocarbon or a mixture of aromatic hydrocarbon and alcohol or mineral spirit yields a film having a flame, water, acid and alkali resistances without impairing the undercoat in the case of coating on to an oil paint for general use.

(4) The acid resistance and water resistance of an acrylic resin film is improved and the flame retarding property is achieved by blending the copolymer with an acrylic resin paint using a mixed solvent of an aromatic hydrocarbon and alcohol.

(5) In the production of vinyl type inks, pigments or dyes suffering deteriorations with the passage of time in the presence of a ketone or ester can be solved by the use of a solvent consisting mainly of an aromatic hydrocarbon.

(6) It is possible to impart flame retarding films, coloring and ornaments to various synthetic resin moldings such as less solvent-resisting ABS resin, styrene resin, high impact styrene resin, acrylonitrile-styrene resin and methacrylic resin without lowering the resin strength. These synthetic resins are attacked by ketones or esters, resulting in a remarkable lowering of the strength and lustre, but can be coated with an excellent film by the use of our paint using a mixed solvent of aromatic hydrocarbon with alcohol, paraffinic or naphthenic hydrocarbon.

(7) The water resistance, chemicals resistance, shock resistance and bending resistance of an alkyd resin can be raised by application thereto or by joint use with an oil-miscible alkyd resin in a dissolved state in an aromatic hydrocarbon.

(8) Moreover, it is to be noted that the miscibility of the composition of the invention is very excellent with titanium white. The conventional vinyl chloride type resin paint has a low miscibility with titanium white so that, when 100 parts of the resin is mixed with 70 parts of titanium white, the surface lustre of a film formed after coating is markedly deteriorated, and only a low titanium white content paint composition is put to practical use. A lack of titanium white content is known to cause a lowering of the masking strength of a paint. This is one of the major obstacles to using the vinyl chloride type paints as paints for general use. The composition of the invention, even if adding titanium white in a proportion of 100 parts to 100 parts of the resin, can hold an excellent surface lustre on a film and mask a substrate through a less number of lap coatings.

(9) Since the solvent consists mainly of an aromatic hydrocarbon, even a non-polar material such as paraffin can be mixed in a larger proportion than in the known paint, whereby the moisture permeability and bending strength can be raised.

(10) Properties of the coating film of the invention are generally superior to those in the case of a vinyl chloride-vinyl acetate copolymer paint, as shown in Example 6.

It is well known, of course, that a copolymer of vinyl chloride with a vinyl ester, alkyl acrylate or maleic acid ester is available as a rigid or semi-rigid vinyl chloride resin for molding. However, it has been found that our vinyl chloride copolymers have remarkable solubilities in aromatic hydrocarbon solvents, not shared by the commonly used vinyl chloride-vinyl acetate copolymer for paint or in copolymers of vinyl chloride with methyl acrylate, dimethyl maleate, dimethyl fumarate, vinyl stearate or lauryl acrylate. In particular, paint compositions of this invention provides new paint compositions which are capable of providing an incombustible enamel as prescribed in JIS K-5582 with an aromatic hydrocarbon solvent or a mixed solvent containing a poor solvent for vinyl chloride, such as alcohols and mineral spirits.

The following examples with comparisons are given in order to illustrate the invention without limiting the same. All parts or percentages are by weight unless otherwise stated.

The test methods in examples are as follows.

"Specific viscosity" is measured at 24° C. concerning a solution of 0.48 g. of a dry copolymer dissolved in nitrobenzene to be 100 ml. (Goodrich specific viscosity).

"Vinyl chloride content" in the tables is obtained by measuring the quantity of chlorine contained in a resin in the manner similar to JIS K-5581 and computing in terms of the vinyl chloride content. That is to say, a resin sample is dissolved in tetrahydrofuran, precipitated with a mixed solution of tetrahydrofuran-methanol and then with aqueous methanol solution, and after repeating this procedure two times, dried under reduced pressure. About 0.2 g. of the sample is then precisely weighed, charged to a crucible of porcelain so as to be buried in about 10 g. of calcium oxide and heated gradually from the bottom. After decomposition of the sample, the resulting calcium chloride is weakly acidified with nitric acid and titrated dropwise with an aqueous solution of N/10 silver nitrate, the end point being determined by the potentiometric titration, from which the quantity of chlorine is calculated.

"Solubilities in toluene, xylene and Swasol #1000" are found by adding a sample to each of the solvents so that the solid content may be 35% by weight after preparation of the solution, stirring the mixture at a constant temperature of 25° C. for thirty minutes to dissolve the sample and examining the transparency of the solution with the naked eye. The solubilities are rated by the following standards.

(A) Completely transparent solution.

(B) Slightly hazy. There is scarcely a difference between A and B unless both are examined comparatively. In using a paint, there is no trouble.

(C) Somewhat strongly hazy but not precipitated. When 5% or less of a ketone or ester is added, this becomes equal to A. In using a paint, there is no trouble.

(D) Remarkable white turbidity is formed and cumulus-like layer is settled after standing. This does not become equal to A unless a ketone or ester is added to be contained in a proportion of 5 to 30%.

(E) Precipitation occurs clearly. Not dissolved unless a ketone or ester is added to the solvent to be 30 to 50%.

Swasol #1000 used in this estimation is marketed as an aromatic hydrocarbon solvent from Maruzen Oil Co., Ltd., consisting mainly of aromatic hydrocarbons of nine carbon atoms and having, for example, the following composition.

| Components: | Amount percent |
|---|---|
| 1,2,4-trimethylbenzene | [1] 49.2 |
| 1,3,5-trimethylbenzene and orthoethyl toluene | [1] 17.6 |
| 1,2,3-trimethylbenzene | [1] 8.5 |
| Metha- and para-ethyl toluene | [1] 20.8 |
| Propylbenzene | [1] 2.5 |
| Xylene and ethylbenzene | [2] 1.4 |

[1] 9 carbon atoms.
[2] 8 carbon atoms.

"Solution viscosity" is found by measuring the foregoing 35% toluene solution at 25° C. by the use of Brookfield Rotational Viscometer.

EXAMPLE 1

420 parts of distilled water in which 0.25 part of partially saponified polyvinyl acetate and 0.08 part of polyoxyethylene sorbitan monolaurate had been dissolved was charged to a stainless autoclave and, after repeating pressure reducing and nitrogen rinsing, a mixture of the following monomers and a chain transfer agent (carbon tetrachloride) was charged thereto, followed by polymerization. 0.02 part of dimethylazobisvaleronitrile and 0.24 part of lauroyl peroxide were used as a catalyst, dissolved in vinyl chloride monomer and charged under pressure. The charge of vinyl chloride was incrementally effected, concerning all the following samples in such a manner that 46% of all the vinyl chloride was charged prior to polymerization and the remaining 54% was added at a rate of 3% per hour during the reaction in order to keep uniform the copolymer composition of a polymer formed throughout the whole polymerization. The chain transfer agent is so regulated that the average degrees of polymerization of the samples may be substantially equal. After a predetermined period of time, the monomer was recovered and the content was filtered, washed with water and dried to give a powdered resin sample. The ratio of the monomer, the polymerization condition, and the characteristic values, solubilities, etc. of the copolymer are tabulated in Table 1.

JIS K-5582 as an incombustible paint. In spite of that, a monomer having one carbon atom or more than nine carbon atoms does not give a copolymer soluble in aromatic hydrocarbons.

In comparing the sample of the invention with the comparative sample, in particular, two-component copolymers of vinyl chloride with vinyl propionate or vinyl acetate, the sample 1 of the invention containing about 22% of vinyl propionate is dissolved in an aromatic hydrocarbon to be a paint, while the comparative sample 1 containing about 22% of vinyl acetate is not dissolved

TABLE 1

| Sample No. | 1 | 2 | 3 | 4 | 5 | 6 | 7 | 8 |
|---|---|---|---|---|---|---|---|---|
| Carbon tetrachloride | 5.5 | 4 | 4 | 4 | 4 | 4 | 4 | 4 |
| Vinyl propionate | 25 | 35 | 45 | | | | | 20 |
| Vinyl valerate | | | | 35 | 45 | | | |
| Vinyl caprylate | | | | | | 35 | 45 | 15 |
| Vinyl chloride | 75 | 65 | 55 | 65 | 55 | 65 | 55 | 65 |
| Reaction temp. (° C.) | 62 | 62 | 65 | 62 | 65 | 62 | 65 | 62 |
| Reaction time (hr.) | 42 | 42 | 42 | 42 | 42 | 42 | 42 | 42 |
| Yield (percent) | 83.4 | 78.5 | 79.2 | 76.7 | 74.4 | 82.4 | 80.8 | 71.8 |
| Specific viscosity | 0.185 | 0.190 | 0.183 | 0.181 | 0.177 | 0.191 | 0.190 | 0.172 |
| Vinyl chloride content (percent) | 78.3 | 69.8 | 61.4 | 68.8 | 61.5 | 73.2 | 62.7 | 70.3 |
| Solubility in toluene | B | A | A | A | A | A | A | A |
| Solubility in xylene | C | A | A | A | A | B | A | A |
| Solubility in Swasol #1000 | C | A | A | A | A | B | B | A |
| Solution viscosity (cp.) | 430 | 350 | 220 | 380 | 300 | 450 | 330 | 310 |

With respect to copolymer samples of vinyl chloride copolymers with monomers having methyl group such as vinyl acetate, methyl acrylate and dimethyl maleate, and monomers such as vinyl esters, acrylic acid esters and maleic acid esters having long chain alkyl group of nine or more carbon atoms as comparative samples, the same tests as in the foregoing were carried out to give the following results (Table 2). In the comparative samples 1, 2, 3, 4, 5, 10 and 11, vinyl chloride was dividedly added in the same manner as in the above samples of 1 to 8 of the invention in order to keep uniform the composition of a copolymer formed throughout the whole polymerization. In the comparative samples 6, 7, 12 and 13, 40% of acrylic acid ester was charged prior to polymerization and the remaining 60% thereof was incrementally added for twenty hours during polymerization in order to keep uniform the composition. In the comparative samples 8 and 9 also, 40% of maleic acid ester was incrementally added for twenty hours.

in aromatic hydrocarbons and even the comparative sample 4 containing about 45% of vinyl acetate is not dissolved in Swasol #1000. When the content of vinyl propionate is further increased, as in the samples 2 and 3 of the invention, the solubility is more excellent. There is no change in such excellent solubility even though using jointly the monomer (b) characteristic of the invention as in the sample 8 of the invention. Where a monomer having a hydrocarbon group of many carbon atoms is copolymerized as in the comparative samples 10 to 14, the solubility is poor. Moreover, where a monomer having methyl group and a monomer having hydrocarbon group of many carbon atoms are copolymerized with vinyl chloride, the solubility in aromatic hydrocarbons is also poor.

The samples of the invention are given as follows (Table 3), containing a copolymer wherein the ethylenically unsaturated monomer (b) characteristic of the invention and the monomer (c) copolymerizable with vinyl chloride are copolymerized with vinyl chloride (a). The

TABLE 2

| Comparative Sample No. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Carbon tetrachloride | 4.3 | 4 | 4 | 4 | 5 | 5 | 5 | 3 | 2.5 | 4 | 4 | 5 | 5 | 3 | 4 | 3.5 | 4 | 4 | 4 |
| Vinyl acetate | 25 | 35 | 45 | 50 | 55 | | | | | | | | | | 20 | 25 | 25 | 30 | |
| Methyl acrylate | | | | | | 35 | 45 | | | | | | | | | | 20 | | 30 |
| Dimethyl maleate | | | | | | | | 35 | 45 | | | | | | | | | | 15 |
| Vinyl stearate | | | | | | | | | | 35 | 45 | | | | | | | | |
| Lauryl acrylate | | | | | | | | | | | | 35 | 45 | | | | | | |
| Didecyl maleate | | | | | | | | | | | | | | 45 | | | | 15 | |
| Vinyl chloride | 75 | 65 | 55 | 50 | 45 | 65 | 55 | 65 | 55 | 65 | 55 | 65 | 55 | 55 | 65 | 55 | 55 | 55 | 55 |
| Reaction temp. (° C.) | 62 | 62 | 62 | 62 | 62 | 65 | 65 | 62 | 62 | 64 | 64 | 65 | 65 | 62 | 62 | 62 | 62 | 62 | 62 |
| Reaction time (hr.) | 42 | 42 | 42 | 42 | 42 | 42 | 42 | 42 | 42 | 42 | 42 | 32 | 32 | 42 | 42 | 42 | 32 | 42 | 32 |
| Yield (percent) | 81.7 | 74.4 | 71.8 | 72.5 | 72.0 | 80.0 | 81.3 | 70.2 | 62.2 | 80.9 | 78.4 | 76.1 | 77.8 | 61 | 84.5 | 76.5 | 86.2 | 72 | 72 |
| Specific viscosity | 0.193 | 0.186 | 0.182 | 0.198 | 0.183 | 0.172 | 0.198 | 0.171 | 0.167 | 0.205 | 0.181 | 0.170 | 0.177 | 0.175 | 0.168 | 0.173 | 0.180 | 0.179 | 0.174 |
| Vinyl chloride content (percent) | 78.1 | 69.4 | 58.8 | 54.7 | 50.1 | 62.5 | 53.6 | 61.4 | 52.1 | 70.3 | 60.6 | 63.5 | 52.5 | 50.8 | 64.2 | 65.0 | 54.1 | 53.4 | 53.2 |
| Solubility in toluene | E | D | C | B | A | E | D | D | C | E | C | E | D | C | D | D | D | D | C |
| Solubility in xylene | E | D | D | C | C | E | E | E | D | E | D | E | E | D | D | D | D | E | D |
| Solubility in Swasol #1000 | E | E | D | D | C | E | E | E | D | E | D | E | E | D | E | E | D | E | E |
| Solution viscosity (cp.) | | | 310 | 210 | | | | | | 680 | | | 430 | | | | | | 490 |

In the comparative samples 4, 5, 7, 9, 13, 14 and 19, the vinyl chloride content is less than that determined in monomer marked * is (b) and the monomer marked ** is (c). Polymerization method is the same as described before. That is, in the sample 10 of the invention, vinyl chloride is added incrementally.

TABLE 3

| Sample No. of the invention | 9 | 10 | 11 |
|---|---|---|---|
| Carbon tetrachloride | 4 | 4 | 3 |
| Vinyl propionate* | 22 | 22 | 22 |
| Vinyl acetate** | 20 | | |
| Methylacrylate** | | 20 | |
| Dimethyl maleate** | | | 20 |
| Vinyl chloride | 58 | 58 | 58 |
| Reaction temp. (° C.) | 62 | 62 | 62 |
| Reaction time (hr.) | 42 | 42 | 42 |
| Yield (percent) | 83.3 | 86.0 | 78.1 |
| Specific viscosity | 0.170 | 0.196 | 0.171 |
| Vinyl chloride content (percent) | 62.7 | 60.5 | 57.6 |
| Solubility in toluene | A | B | A |
| Solubility in xylene | A | B | A |
| Solubility in Swasol #1000 | B | C | B |

EXAMPLE 2

450 parts of distilled water, 50 parts of ethylene glycol, 0.6 part of potassium biscarbonate, 2.5 parts of polyoxyethylene sorbitan monolaurate, 2.5 parts of polymethyl vinyl ether and 0.3 part of ammonium persulfate were charged to a stainless autoclave and dissolved and, after repeating reduction of the pressure and rinsing with nitrogen, a monomer mixture was charged thereto according to the following recipe. The results are tabulated in Table 4.

TABLE 4

| Sample No. of the invention | 12 | 13 |
|---|---|---|
| Trichloroethylene | 2.3 | 2.0 |
| Vinyl benzoate* | 22 | 10 |
| Dibutyl fumarate** | | 12 |
| Vinyl acetate** | 20 | 20 |
| Vinyl chloride | 58 | 58 |
| Reaction temp. (° C.) | 62 | 62 |
| Reaction time (hr.) | 36 | 42 |
| Yield (percent) | 86.5 | 82.4 |
| Specific viscosity | 0.190 | 0.183 |
| Vinyl chloride content (percent) | 61.9 | 58.0 |
| Solubility in toluene | A | A |
| Solubility in xylene | A | A |
| Solubility in Swasol #1000 | B | A |

It will be understood from Table 4 that vinyl benzoate can impart an excellent solubility to the resin. The solubility in aromatic hydrocarbons is favorably compared with that of the comparative samples.

EXAMPLE 3

Figure 4:
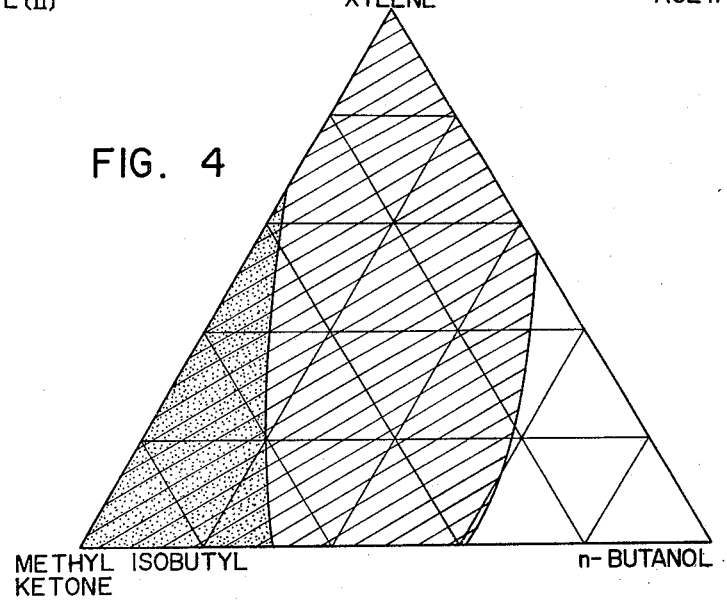
FIGURE 4 is a ternary diagram for illustrating Example 3.

The sample 2 of the invention of Example 1 (vinyl chloride-vinyl propionate copolymer, vinyl chloride content: 69.8%) was dissolved in a mixed solvent system consisting of three components of xylene, methyl isobutyl ketone, and n-butyl alcohol, and a range was determined within which there occurs no cumulus-like precipitate. On the other hand, with respect to the comparative sample 2 of Example 1 having a relatively large content of vinyl acetate (vinyl chloride content: 69.4%) selected as a typical example of vinyl chloride-vinyl acetate copolymer commonly used as a paint, the solubility curve was determined similarly. The results are shown in FIGURE 4, in which the mixed solvent in hatched portion dissolves the sample 2 of the invention and that in dotted portion dissolves the comparative sample 2.

EXAMPLE 4

Figure 5:
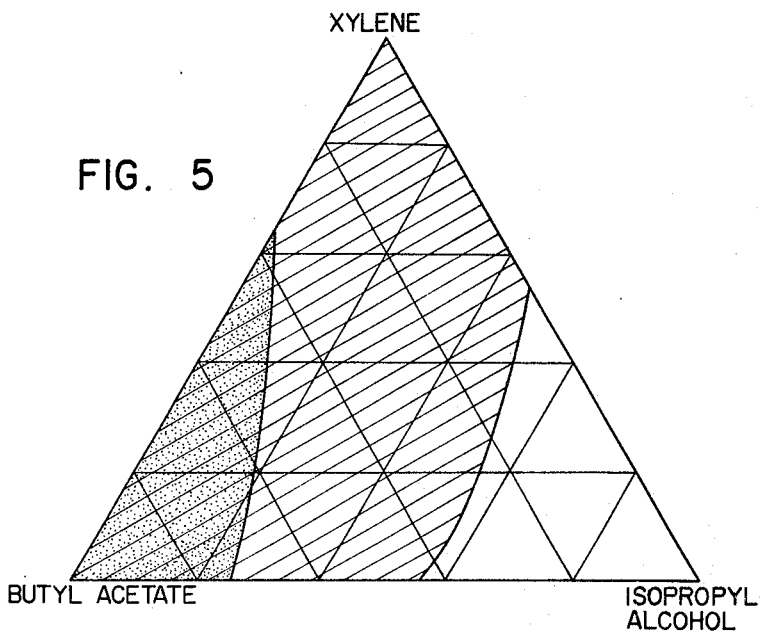
FIGURE 5 is a ternary diagram for illustrating Example 4.

Similarly to Example 3, the sample 2 of the invention and the comparative sample 2 were dissolved in a mixed solvent system of xylene, butyl acetate and isopropyl alcohol and the dissolving ranges were determined respectively. The results are given in FIGURE 5. The hatched portion represents a range to dissolve the sample 2 of the invention, while the dotted portion representing that to dissolve the comparative sample 2.

EXAMPLE 5

Figure 6:
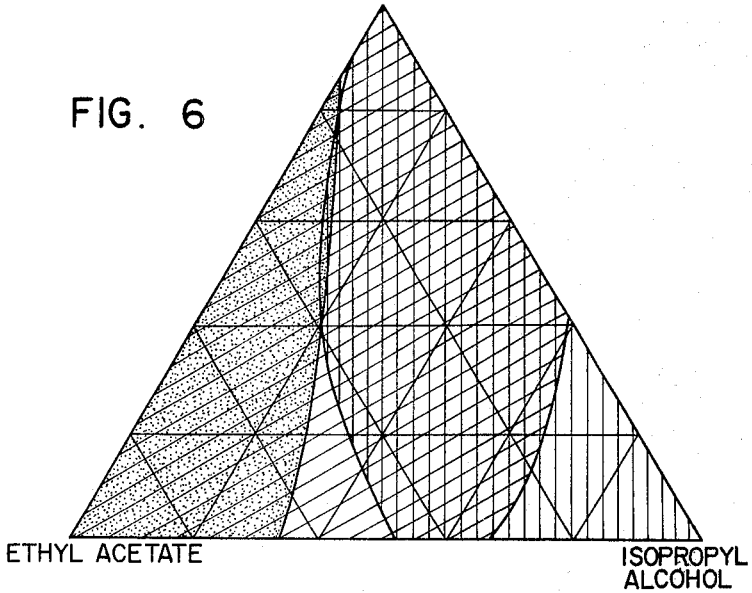
FIGURE 6 is a ternary diagram illustrating Example 5.

With respect to the sample 3 of the invention of Example 1 (vinyl chloride-vinyl propionate copolymer, vinyl chloride content: 61.4%) and the comparative sample 3 (vinyl chloride-vinyl acetate copolymer, vinyl chloride content: 58.8%), the solubility curve in a mixed solvent system of Swasol #1000, ethyl acetate and isopropyl alcohol was determined as in Example 3. In FIGURE 6, the hatched portion is a range to dissolve the sample 3 of the invention, while the dotted portion being a range to dissolve the comparative sample 3.

In the case of using ABS resin as a base material to be coated, a range of a solvent system was determined capable of coating without impairing the base material. Abson 89104 manufactured by the Japanese Geon Co., Ltd. was employed as ABS resin. In FIGURE 6, the vertical line portion is a range within which the solvent system can be applied to ABS resin without impairing the same. That is to say, a paint composition in the superposed portion of slant lines and vertical lines can be used as a finishing paint for ABS resin. Since, as is evident from FIGURE 6, the known vinyl chloride-vinyl acetate copolymer is not dissolved within a range which will not impair ABS resin, application of the vinyl chloride resin paint cannot be effected for the purpose of coloring or imparting chemical resistance to ABS resin. However, this is made possible by the invention. It was judged by examination of the white turbidity with the naked eye, measurement of the surface reflecting power and measurement of the tensile strength of ABS base material whether the ABS resin was impaired or not by the application.

EXAMPLE 6

Results of the general paint tests of the samples of the invention are shown in the following Table 5.

TABLE 5

| Sample | Sample No. of the invention | | | Comparative sample No. | | Marketed vinyl chloride vinyl acetate copolymer by solution polymerization | Vinyl chloride butyl vinyl ether copolymer made in W. Germany |
|---|---|---|---|---|---|---|---|
| | 1 | 3 | 11 | 1 | 3 | | |
| Vinyl chloride content, percent | 78.3 | 61.4 | 57.6 | 78.1 | 58.8 | 70.6 | 81.2 |
| Specific viscosity | 0.185 | 0.183 | 0.171 | 0.193 | 0.182 | 0.177 | 0.129 |
| Characters of the coating: | | | | | | | |
| Heat stability (min.) | 280 | 175 | 130 | 150 | 90 | 100 | 35 |
| Weather resistance | **** | *** | ** | ** | * | ** | *** |
| Alkali resistance | **** | **** | ** | ** | * | * | **** |
| Acid resistance | **** | ** | ** | ** | * | ** | * |
| Salt water resistance | **** | ** | ** | *** | * | ** | * |
| Water resistance | *** | ** | ** | *** | * | ** | * |
| Miscibility with paraffin: | | | | | | | |
| Addition of one part | (2) | (1) | (1) | (4) | (3) | (3) | (3) |
| Addition of three parts | (3) | (1) | (1) | (4) | (4) | (4) | (3) |
| Miscibility with titanium white: | | | | | | | |
| Addition of 50 parts | **** | **** | **** | * | *** | **** | **** |
| Addition of 70 parts | *** | **** | **** | * | ** | ** | ** |
| Addition of 100 parts | ** | **** | *** | * | * | * | * |

NOTE.—**Best, *better, **good, *no good. (1) clear, (2) substantially clear, (3) slightly turbid, (4) turbid.

The test of heat stability is carried out by dissolving a resin in toluene or, where the resin is insoluble in toluene, in a mixed solvent of ethyl acetate and toluene (1:1) so that the solid content may be 30%, applying the thus prepared paint to a piece of paper about 80 microns in thickness in the heat stabilizer-free state and subjecting the coated paper to a heat aging test at 120° C. in an air bath. The results of this table are represented by a time required for turning red-orange.

The weather resistance is represented by the degree of coloring of the thus coated paper after subjecting it to a weather resistance test for 106 hours using a fade-o-meter. The resutls of this test are rated as "best," "better," "good," and "no good" as in the other tests, the judgments better than "good" herein meaning that the paints can be put to practical use.

The alkali resistance is determined by immersing a polished steel sheet coated with the foregoing paint in a 10% aqueous caustic soda solution at room temperature 144 hours and observing the surface state, the results of this test being ordered in the same manner as above.

Similarly, the acid resistance is determined by the use of a 10% aqueous nitric acid solution as such immersing solution, and the salt water resistance, by the use of a 5% aqueous sodium chloride solution. The immersion time is 144 hours in each case.

The water resistance is determined by immersing a steel sheet coated similarly in distilled water for 144 hours and observing a whitening or swelling of the coating or rust appearing on the steel sheet.

The miscibility with paraffin is obtained by adding a mixed paraffin of 10 to 20 carbon atoms to a resin in a proportion of 1 and 3 parts to 100 parts of the resin, thus dissolving it so that the solid content may be 30% as in the test of heat stability, applying the resulting paint to a glass sheet, drying and judging the transparency of the coating.

The miscibility with titanium white is determined by mixing titanium oxide of rutile-type previously pulverized for twenty-four hours in a ball mill with a resin in a proportion of 50, 70 and 100 parts to 100 parts of the resin, dissolving the mixture in toluene or a mixed solvent of methyl isobutyl ketone-toluene (1:1) so that the solid content may be 30% carrying out lap coating of the thus resulting paint on a sheet of black paper until the black disappears completely and observing the surface state of the coating, that is, lustre or wrinkle under such a state that the covering is complete.

EXAMPLE 7

To a stainless autoclave were charged 400 parts of distilled water, 0.2 part of partially saponified polyvinyl acetate, 0.1 part of polyoxyethylene glycol monoalkyl ester and 0.45 part of lauroyl peroxide, and then were charged carbon tetrachloride and one of the following monomers except vinyl chloride. The upper atmosphere of the autoclave was substituted with nitrogen and then filled with vinyl chloride under pressure. The amount of carbon tetrachloride was so varied in each sample that the average degree of polymerization might be substantially the same. Moreover, in the copolymerization reaction of vinyl ester and vinyl chloride, 46% of all the charge of vinyl chloride was charged prior to polymerization and the remaining percentage was incrementally charged during the reaction at a rate of 3% per hour. The results are shown in the following table. However, the comparative samples shown in Table 6 are the same as those used in Example 8, illustrating comparative samples of the adhesiveness of the sample of the present invention.

TABLE 6

| Sample | Sample of No. of the invention | | | | | Comparative sample No. | | |
|---|---|---|---|---|---|---|---|---|
|  | 14 | 15 | 16 | 17 | 18 | 19 | 20 | 21 |
| Carbon tetrachloride | 5.7 | 3.3 | 3.3 | 3.3 | 3.0 | 3.0 | 4.0 | 4.2 |
| Vinyl acetate |  |  |  |  |  |  | 20 | 20 |
| Butyl acrylate |  |  |  |  |  |  | 21 | 22 |
| Vinyl propionate | 22 | 32 | 21 | 21 |  |  |  |  |
| Vinyl caprylate |  |  |  |  | 33 | 33 |  |  |
| Maleic anhydride | 1.0 | 3.0 |  |  |  |  | 1.0 |  |
| Itaconic anhydride |  |  | 2.0 |  |  |  |  |  |
| CPMA* |  |  |  | 2.0 | 2.0 | 1.0 |  |  |
| Vinyl chloride | 77 | 65 | 77 | 77 | 65 | 65 | 58 | 58 |
| Reaction temp. (° C.) | 62 | 62 | 62 | 62 | 62 | 62 | 60 | 62 |
| Reaction time (hr.) | 32 | 32 | 36 | 36 | 42 | 42 | 32 | 42 |
| Yield (percent) | 88.7 | 86.2 | 83.1 | 70.3 | 74.0 | 75.8 | 87.1 | 91.1 |
| Specific viscosity | 0.175 | 0.188 | 0.166 | 0.169 | 0.147 | 0.178 | 0.185 | 0.183 |
| Solubility in toluene | A | A | B | A | A | A | A | B |
| Solubility in xylene | B | A | B | B | A | A | B | B |
| Solubility in Swasol | B | A | C | B | A | A | B | C |

*CPMA means cyclopentadiene-maleic anhydride adduct.

The samples of the invention are all excellent in their solubility in aromatic hydrocarbons, while those obtained by copolymerizing 1.0–3.0 parts of hydroxypropyl acrylate, hydroxyethyl acrylate, acrylic acid, methacrylic acid, itaconic acid, acrylamide, N-methylol acrylamide, vinyl ketone and vinylcyclohexene monoxide by this polymerization method are all unsatisfactory in their solubility in aromatic hydrocarbons.

EXAMPLE 8

A resin material mixture was prepared as shown in the following Table 7 and dissolved in toluene to give a coating solution having 20% of the resin content. The resulting solution was applied to a polished steel sheet purified with acetone to give a coating of 30 microns in thickness based on dry base, and dried at room temperature for day and night. The coating was equally cut in 100 squares of 1 cm. x 1 cm. by the use of a razor, an adhesive tape was pressed thereto and then stripped therefrom to observe the stripping state (adhesiveness) of the coating. The number of the squares stripped of the foregoing 100 squares of the coating was represented as "degree of stripping."

TABLE 7.—RESIN COMPOSITION (PARTS)

| | | | | | | | | |
|---|---|---|---|---|---|---|---|---|
| Comparative Sample No. 20 | 40 | 30 | 20 |  |  |  |  |  |
| Comparative Sample No. 21 | 60 | 70 | 80 | 100 |  |  |  |  |
| Sample No. of the Invention No. 15 |  |  |  |  | 40 | 20 | 10 | 5 |
| Sample No. of the Invention No. 2 |  |  |  |  | 60 | 80 | 90 | 96 |
| Degree of Stripping | 12 | 50 | 97 | 100 | 0 | 0 | 8 | 5 |

Table 7 shows that the adhesiveness of the present invention is excellent.

What is claimed is:

1. A vinyl chloride type resin paint solution comprising (1) a vinyl chloride copolymer comprising (a) 50–

80% by weight of vinyl chloride, (b) 2-50% by weight of at least one ethylenically unsaturated monomer as represented by the structural formulas:

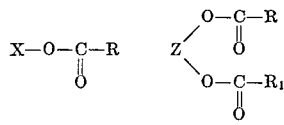

in which X is selected from the group consisting of

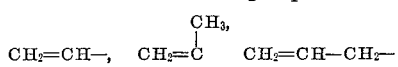

and

Z is

R is selected from the group consisting of acyclic and cyclic hydrocarbon groups having 2-8 carbon atoms and $R_1$ is selected from the group consisting of hydrogen, acyclic and cyclic hydrocarbon groups having 1-12 carbon atoms, and (c) 0-48% by weight of another monomer copolymerizable with vinyl chloride, and (2) a solvent consisting essentially of aromatic hydrocarbons.

2. A paint solution according to claim 1, wherein ethylenically unsaturated monomer (b) is a vinyl ester represented by the structural formula:

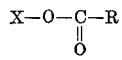

wherein R is an acyclic hydrocarbon group having 2-8 carbon atoms.

3. A paint solution according to claim 1, wherein the ethylenically unsaturated monomer (b) is selected from the group consisting of vinyl propionate, vinyl valerate, vinyl caprolate and vinyl benzoate.

4. A paint solution according to claim 1, wherein monomer (c) copolymerizable with vinyl chloride is selected from the group consisting of vinyl acetate, methyl acrylate and dimethyl maleate.

5. A paint solution according to claim 1, wherein vinyl chloride copolymer (1) is a copolymer of vinyl chloride and vinyl propionate.

6. A paint solution according to claim 1, wherein vinyl chloride copolymer (1) is an interpolymer of vinyl chloride, vinyl propionate and vinyl acetate.

7. A paint composition according to claim 1, wherein the solvent consists essentially of toluene.

8. A paint composition according to claim 1, wherein the solvent consists essentially of xylene.

9. A paint solution according to claim 1, wherein the weight percent ratio of vinyl chloride copolymer (1) to solvent (2) is within the range of (5-60) copolymer to about (95-40) solvent.

10. A vinyl chloride type resin paint composition comprising (1) a vinyl chloride copolymer comprising (a) 50-80% by weight of vinyl chloride, (b) 2-50% by weight of at least one ethylenically unsaturated monomer as represented by the structural formulas:

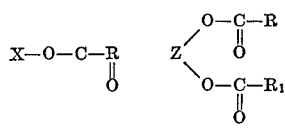

in which X is selected from the group consisting of

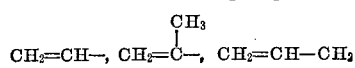

and

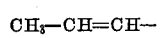

Z is

R is selected from the group consisting of acyclic and cyclic hydrocarbon groups having 2-8 carbon atoms and $R_1$ is selected from the group consisting of hydrogen, acyclic and cyclic hydrocarbon groups of 1-12 carbon atoms, (c) 0-47.95% by weight of another monomer copolymerizable with vinyl chloride, (d) 0.05-30% by weight of at least one unsaturated acid anhydride selected from the group consisting of maleic anhydride, itaconic anhydride and bicyclo (2,2,1)-5-heptene-2,3-dicarboxylic acid anhydride and (2) a solvent consisting essentially of aromatic hydrocarbons.

11. A paint solution according to claim 10, wherein ethylenically unsaturated monomer (b) is a vinyl ester represented by the structural formula:

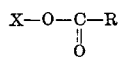

wherein R is an acyclic hydrocarbon group having 2-8 carbon atoms.

12. A paint solution according to claim 10, wherein ethylenically unsaturated monomer (b) is selected from the group consisting of vinyl propionate, vinyl valerate, vinyl caprolate and vinyl benzoate.

13. A paint solution according to claim 10, wherein monomer (c) is selected from the group consisting of vinyl acetate, methyl acrylate and dimethyl maleate.

14. A point solution according to claim 10, wherein vinyl chloride copolymer (1) is an interpolymer of vinyl chloride, vinyl propionate and at least one unsaturated acid anhydride selected from the group consisting of maleic anhydride, itaconic anhydride and bicyclo-(2,2,1)-5-heptene-2,3-dicarboxylic acid anhydride.

15. A paint solution according to claim 10, wherein vinyl chloride copolymer (1) is an interpolymer of vinyl chloride, vinyl propionate, vinyl acetate and at least one unsaturated acid anhydride selected from the group consisting of maleic anhydride, itaconic anhydride and bicyclo-(2,2,1)-5-heptene-2,3-dicarboxylic acid anhydride.

16. A paint composition according to claim 10, wherein the aromatic hydrocarbon solvent consists essentially of toluene.

17. A paint composition according to claim 10, wherein the aromatic hydrocarbon solvent consists essentially of xylene.

18. A paint composition according to claim 10, wherein vinyl chloride copolymer (1) is an interpolymer of vinyl chloride, vinyl propionate and maleic anhydride.

19. A paint composition according to claim 10, wherein vinyl chloride copolymer (1) is an interpolymer of vinyl chloride, vinyl propionate, vinyl acetate and maleic anhydride.

References Cited

UNITED STATES PATENTS

| | | |
|---|---|---|
| 2,136,378 | 11/1938 | Doolittle. |
| 2,264,625 | 12/1941 | Doolittle. |
| 2,530,738 | 11/1950 | Spessard. |
| 3,084,136 | 4/1963 | Chapin et al. |
| 3,177,092 | 4/1965 | Meyers et al. |
| 3,219,636 | 11/1965 | Loshack et al. _____ 260—78.5 |

FOREIGN PATENTS

| | | |
|---|---|---|
| 922,582 | 4/1963 | Great Britain. |

OTHER REFERENCES

Payne: Organic Coating Technology, vol. I, John Wiley & Sons, Inc., 1954, p. 510, Sci. Lib., TP935P38.

MORRIS LIEBMAN, Primary Examiner

L. T. JACOBS, Assistant Examiner

U.S. Cl. X.R.

260—33.2, 33.4